Feb. 14, 1961     F. G. REUTER ET AL     2,971,356
FLEXIBLE SHAFT CONNECTIONS
Filed May 13, 1957
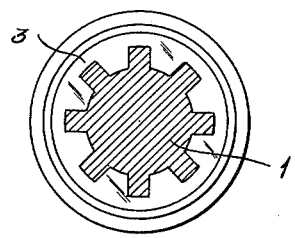
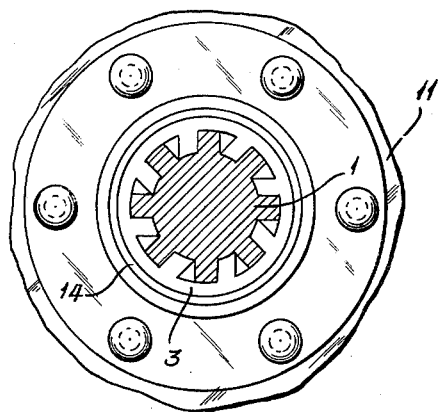
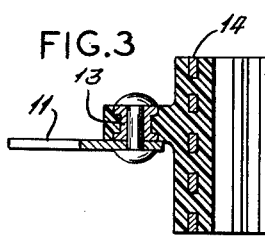 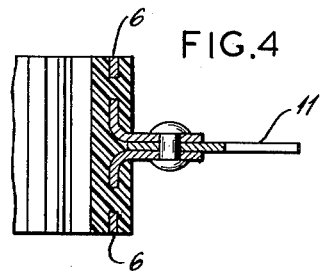

United States Patent Office 2,971,356
Patented Feb. 14, 1961

2,971,356

FLEXIBLE SHAFT CONNECTIONS

Franz Gottfried Reuter and Georg Sigfried Kindel, both of Lemforde, Hannover, Germany, assignors, by mesne assignments, to Mobay Chemical Company, Pittsburgh, Pa., a corporation of Delaware Filed May 13, 1957, Ser. No. 658,651

Claims priority, application Germany May 15, 1956

9 Claims. (Cl. 64—27)

This invention relates generally to shaft connections or couplings and, more particularly, to an improved flexible shaft and hub connection for vehicles.

The hub and shaft of a vehicle are ordinarily made of metal with the shaft having a plurality of splines which mesh with splines in the surrounding hub. Usually the hub supports a clutch disc on an annular flange. The metallic shaft connections are generally rigid and it is very difficult to provide a flexible transmission with clutches which permit engagement without some metal to metal wear and starting shock. Flexibility is achieved only through the discs sliding together. It has been proposed to provide a more flexible transmission by inserting spring bands or a rubber block between the clutch plates, but such connections have not been very satisfactory.

It is therefore an object of this invention to provide an improved shaft and hub connection. Another object of this invention is to provide a novel and improved shaft and hub for motor vehicles. Still another object of the invention is to provide a shaft connection or coupling which makes it possible to provide flexible transmissions in motor vehicles.

Other objects will become apparent from the following description with reference to the accompanying drawing in which Figure 1 is an end view of a shaft and hub assembly;

Figure 2 is another embodiment of the invention showing a variation in the shaft and hub assembly;

Figure 3 illustrates an embodiment provided with a clutch plate; and

Figure 4 is an illustration of still another embodiment assembled with a clutch plate.

Generally speaking, the objects of this invention are accomplished by providing a shaft and hub assembly having one member of the assembly made from a rubber-like polyurethane plastic and the other from a similar material or metal. In order to be suitable, the polyurethane plastic must have a Shore hardness of from about 70° to about 100°. The elasticity of the polyurethane plastic must be from about 30% to about 60%. The tensile strength should be from about 200 kg./cm.² to about 350 kg./cm.².

In a preferred embodiment of the invention, the hub is provided with splines which are slightly larger than the splines of the shaft to be used therewith and provide a substantially triangularly shaped space between the spline on the shaft and the wall of the spline of the hub when no stresses are being applied through the shaft. The presence of these spaces provides greater flexibility in the shaft and hub connection by providing space for shifting of the lands of the hub as torque is applied to the shaft. The special profile of the splines on the hub, illustrated in Figure 2, makes it possible to take advantage of the resiliency of the plastic hub. As the splines of the shaft bear against the wall of the spline in the hub, there is a tendency for the hub spline to move forward with the movement of the shaft. As the spline moves, some of the starting shock is absorbed.

In another preferred embodiment of the invention the hub may be formed from a polyurethane plastic and have only the splines which mesh with the splines on the shaft lined with suitable metal inserts. In most embodiments, however, the hub will be made from the polyurethane plastic and the drive shaft will be formed from metal.

If the hub is formed from a polyurethane plastic, metallic inserts may be included which project outwardly to provide annular metal flanges for mounting the clutch discs on the hub. Alternatively, the plastic hub may be provided with a plurality of metallic rings completely embedded in the walls of the hub and a plastic annular flange may be provided for mounting the clutch disc on the hub. Indeed, the cylindrical ring may be one large ring completely embedded in the hub.

As indicated hereinbefore, the polyurethane plastic must be cast from a mixture of components which impart a high tensile strength and elasticity to the resulting polyurethane plastic object. The polyurethane plastic may be formed by any suitable combination of components which provide these physical characteristics, such as, for example, from the components and by the processes disclosed in U.S. Patents 2,729,618, 2,778,810, 2,764,565, 2,621,166 and 2,620,516. The polyurethane plastics may be prepared by reacting a polyester with an organic polyisocyanate or by reacting any other suitable organic compound having reactive hydrogen atoms, such as, for example, a polyether glycol, a polyester amide, or the like, with the organic polyisocyanate. Various suitable organic polyisocyanates, polyesters, polyether glycols and polyester amides are disclosed in the aforesaid patents. Suitable activators, such as those disclosed in the patents, may also be used in forming the rubber-like polyurethane plastic. The activator and isocyanate may be injected into a confined stream of the organic compound having the reactive hydrogen atoms in accordance with the process disclosed in U.S. 2,764,565. The resulting mixture is then poured into a suitable mold until complete chemical reaction and curing of the resulting plastic. Curing may be accelerated by heating to temperatures of 100° C. or more.

Referring now to the drawing, Figure 1 illustrates a hub 3 of rubber-like polyurethane plastic having a Shore hardness of about 90°, a tensile strength of about 300 kg./cm.² and an elasticity of about 40%. Shaft 1 has a plurality of splines 2 which mesh with the notches and splines in hub 3. The inside diameter of the hub and the outside diameter of the shaft may be of such dimensions that the splines 2 fit snugly within the notches and against splines 4 of the hub. They may be joined in a shrink-fit relationship.

The assembly of Figure 2 is of a metal shaft 1 having splines 2 meshing with the splines in hub 3 which is formed from a rubber-like polyurethane plastic having physical characteristics substantially the same as those in Example 1. Notches or grooves 5 in between the splines of hub 3 are larger than splines 2 providing a substantially triangularly shaped cavity or space between lands 4a and splines 2. The front surfaces of the lands 4a and splines 2 fit together in such a way that upon rotation of shaft 1 an elastic and play-free meshing of the shaft with the hub is achieved. The embodiment thus provides a rigid but flexible joint between the shaft and hub.

The embodiment of Figure 3 is provided with annular metal rings 6 and 7 having perforations 8 which become filled with the polyurethane plastic as hub 3 is cast, thereby firmly anchoring the metal ring within the plastic hub. The metal rings 6 and 7 terminate in protruding annular flanges 9 and 10 and clutch disc 11 is riveted therebetween.

In the embodiment of Figure 4, the flange 12 is integral with the walls of the polyurethane plastic hub and is provided with opening 13 having a metal liner. Clutch disc 11 is riveted to the plastic flange and the metal insert in the opening adds strength to the connection. The hub is also reinforced by means of a plurality of cylindrical rings 14.

In most instances, it is preferred to have the shaft 1 made of metal and hub 3 of the polyurethane plastic. It is also possible, however, to make the hub 3 of metal and the shaft 1 of the polyurethane plastic, it being important only that one of the two parts be formed from the plastic material. Any suitable metal, such as steel, bronze and the like, may be used.

The following is an example of a suitable formulation for making a polyurethane plastic which may be cast into either a hub or shaft in accordance with this invention.

*Example 1*

1,000 parts of a linear hydroxyl polyester obtained by thermal esterification of adipic acid with ethylene glycol and characterized by having a molecular weight of 2,000, an hydroxyl number of 50 and an acid number of 1 is heated at 135° C. in vacuo for 1 hour in order to completely remove the moisture contained therein. Then 3 parts of molybdenum disulfide, particle size 0.01 mm. (in diameter), 3 parts of a dimethyl-siloxane polymer with a viscosity of 140 centistokes/20° C. and 2 parts of solid paraffin are added. Subsequently, 300 parts of naphthylene-1,5-diisocyanate are introduced into the mixture. The components are allowed to react for 10 minutes in vacuo. Thereupon, 70 parts of 1,4-butanediol containing 1% of dry hydrogen chloride are added within 1 minute to the melt with vigorous stirring. The resulting product is poured into heated molds for flexible shaft connections where it is maintained for 24 hours at 110° C. to produce a cured rubber-like material. The elastomer thus obtained is black and distinguished by the particular properties of its surface.

*Example 2*

1,000 parts of a linear hydroxyl polyether obtained by thermal condensation of thiodiglycol (1,220 parts) with ethylene glycol (620 parts) in the presence of 0.25% of p-toluene-sulfonic acid-methylester and characterized by having an OH number of 63 are mixed with 190 parts of 1,5-naphthylene diisocyanate by stirring at 124° C. 2.5 parts of molybdenum disulfide, particle size 0.02 mm. (in diameter), and 2 parts of a dimethyl-siloxane polymer with a viscosity of 50 centistokes/20° C. are added to this mixture. The mixture is allowed to react for 9 minutes in vacuo. Thereupon 21 parts of 1,4-butylene glycol are added within 1 minute to the melt with vigorous stirring. The resulting product is poured into molds for flexible shaft connections and heated for a further 24 hours at 110° C. to produce a cured rubber-like material with outstanding friction properties.

Although the invention has been described in considerable detail in the foregoing for the purpose of illustration, it is to be understood that such detail is solely for this purpose and that variations can be made by those skilled in the art without departing from the spirit and scope of the invention except as is set forth in the claims.

What is claimed is:

1. A shaft connection comprising a metallic shaft carrying splines thereon, a cast polyurethane hub about said shaft having splines with notches therebetween, said notches being wider at the base than at the open end thereof and having one sloping sidewall and one sidewall substantially parallel with the radial axis of the hub, the splines on the shaft extending into the notches and meshing with the splines on the hub whereby said hub is rotated as the shaft rotates.

2. A shaft connection comprising a metallic shaft having splines thereon and a cast polyurethane plastic hub about said shaft having splines with notches therebetween meshing with the splines on the shaft, said notches being larger than the splines on the shaft, said polyurethane having a Shore hardness of from about 70° to about 100°, a tensile strength of from about 200 kg./cm.$^2$ to about 300 kg./cm.$^2$, and an elasticity of from about 30 percent to about 60 percent; said hub having a metal reinforcement embedded in said hub protruding outwardly into an annular flange adapted to receive a clutch plate.

3. A shaft connection comprising a metallic shaft having splines thereon and a cast polyurethane plastic hub about said shaft having splines with notches therebetween meshing with the splines on the shaft, said notches being larger than the splines on the shaft, said polyurethane having a Shore hardness of from about 70° to about 100°, a tensile strength of from about 200 kg./cm.$^2$ to about 300 kg./cm.$^2$, and an elasticity of from about 30 percent to about 60 percent; said hub having an annular molded plastic ring adapted to receive the clutch plate.

4. A shaft connection comprising a metallic shaft having splines thereon and a polyurethane hub about said shaft having splines with notches therebetween meshing with the splines on the shaft, said notches being wider at the base than at the open end thereof, whereby said notches have a sloping side wall.

5. A shaft connection comprising a metallic shaft having splines thereon, a hub about said shaft having splines and notches therebetween meshing with the splines on the shaft, said hub being cast polyurethane plastic having a Shore hardness of from about 70° to about 100°, a tensile strength of from about 200 to about 300 kg./cm.$^2$, and an elasticity of from about 30 percent to about 60 percent; said hub having annular metal rings embedded therein, said rings having perforations filled with polyurethane plastic, said rings terminating along one edge in annular flanges which extend outwardly and substantially perpendicular to the wall of the hub, said flanges lying in face-to-face relationship and being adapted to receive a clutch disc therebetween.

6. A shaft connection comprising a metallic shaft having splines thereon, a hub about said shaft having splines and notches therebetween meshing with the splines on the shaft, said hub being cast polyurethane plastic having a Shore hardness of about 70° to about 100°, a tensile strength of from about 200 to about 300 kg./cm.$^2$, and an elasticity of from about 30 percent to about 60 percent; said hub having an integral polyurethane annular flange lying in a plane substantially perpendicular to the side walls of the hub and adapted to be fastened to a clutch disc.

7. A shaft connection comprising a shaft having splines thereon and a hub about said shaft having splines with notches therebetween meshing with the splines on the shaft, said notches being wider at the base than at the open end thereof, whereby said notches have a sloping side wall, the splines on one of the said members being metal and the splines on the other member being polyurethane plastic.

8. A shaft connection comprising a cast polyurethane shaft having splines thereon and a metallic hub about said shaft having splines with notches therebetween meshing with the splines on the shaft, said notches being wider at the base than at the open end thereof, whereby said notches have a sloping side wall.

9. A shaft connection comprising a metallic shaft having splines thereon, a cast polyurethane hub about said shaft having splines and notches therebetween meshing with the splines on the shaft, said hub having metal reinforcements embedded therein which protrude outwardly into an annular flange adapted to receive a clutch plate.

References Cited in the file of this patent

UNITED STATES PATENTS

| | | |
|---|---|---|
| 1,259,541 | McFerren | Mar. 19, 1918 |
| 2,121,819 | Oles | June 28, 1938 |
| 2,297,619 | Haberstump | Sept. 29, 1942 |
| 2,466,440 | Kiekhaefer | Apr. 5, 1949 |
| 2,613,785 | Moltns | Oct. 14, 1952 |
| 2,699,656 | Anderson et al. | Jan. 8, 1955 |
| 2,729,618 | Muller et al. | Jan. 3, 1956 |
| 2,740,271 | Beler | Apr. 3, 1956 |
| 2,785,580 | Andrews | Mar. 19, 1957 |